W. E. VER PLANCK.
VENTILATING SYSTEM FOR CAR MOTORS.
APPLICATION FILED JULY 31, 1915.
1,239,647.
Patented Sept. 11, 1917.
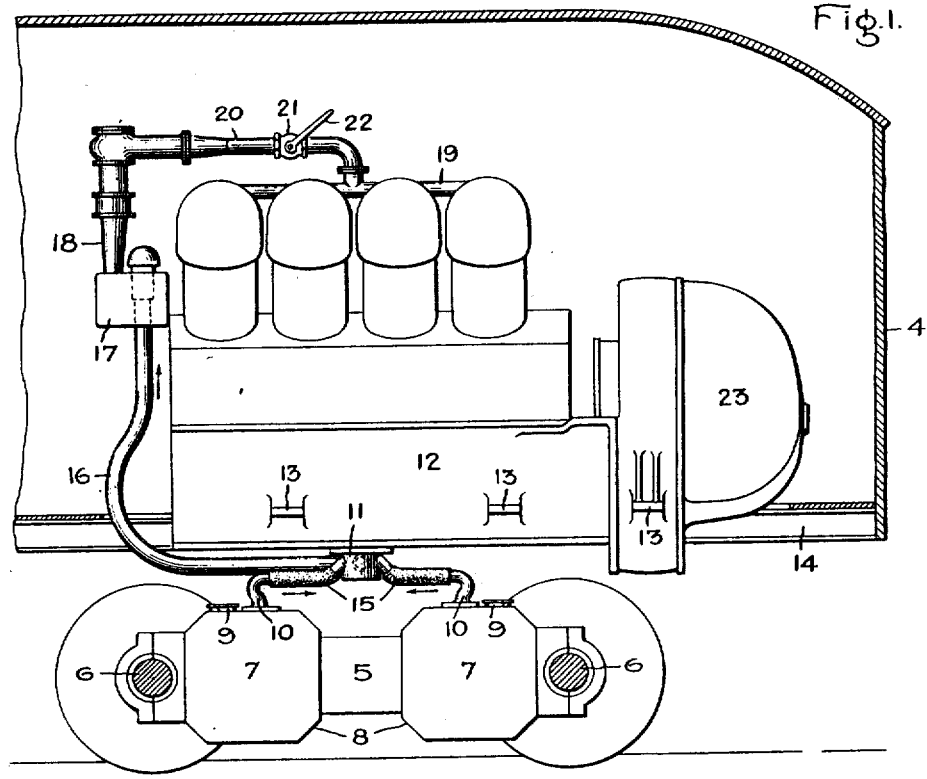
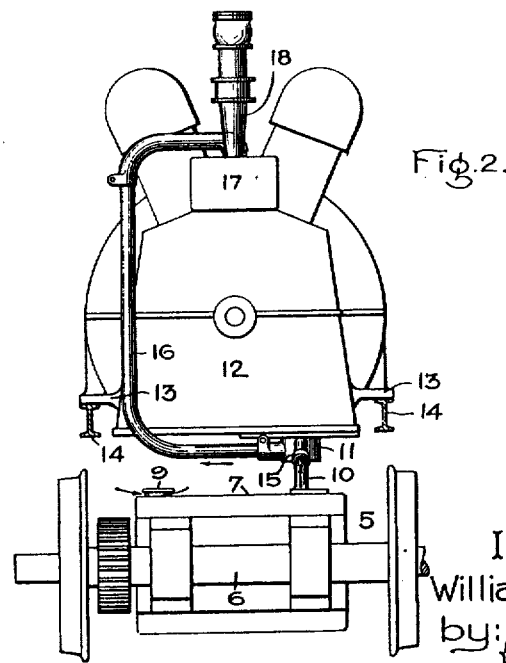
Inventor:
William E. Ver Planck
by: *[signature]*
His Attorney.

UNITED STATES PATENT OFFICE.

WILLIAM EVERETT VER PLANCK, OF ERIE, PENNSYLVANIA, ASSIGNOR TO GENERAL ELECTRIC COMPANY, A CORPORATION OF NEW YORK.

VENTILATING SYSTEM FOR CAR-MOTORS.

1,239,647.  Specification of Letters Patent.  Patented Sept. 11, 1917.

Application filed July 31, 1915. Serial No. 42,991.

*To all whom it may concern:*

Be it known that I, WILLIAM EVERETT VER PLANCK, a citizen of the United States, residing at Erie, in the county of Erie, State of Pennsylvania, have invented certain new and useful Improvements in Ventilating Systems for Car-Motors, of which the following is a specification.

The present invention relates to motor cars in which an internal combustion engine drives an electric generator which in turn supplies current to one or more electric motors that are mounted on the truck or trucks for propelling the car. In such a system the speed of the engine has to be widely varied to meet the different operating conditions as to car speeds, grades, etc. In actual practice it is common to vary the speed from 300 to 600 R. P. M. As a general proposition it may be stated that the speed of the engine varies with the load. The propelling motors develop considerable heat in their operation which it is desirable to dissipate as fully as possible to prevent overheating. The amount of heat thus developed increases with the load and consequently with the speed of the engine.

The object of my invention is to provide a ventilating system for the electrical apparatus of a motor car and more specifically for the propelling motors, the effect of which varies with the speed of the prime mover. That is to say, as the speed is increased the amount of cooling fluid circulating through the electrical apparatus, as represented, for example, by the motor or motors, is correspondingly increased, whereby a greater cooling effect is obtained for heavy than for light loads.

In carrying out my invention each of the motors is provided with a suitable inclosing casing having an inlet through which cool air enters from the atmosphere, and an outlet for the air after it has extracted heat from the parts of said motor. As is well known, the amount of air required by an internal combustion engine in its operation varies with varying speeds, it being greater as the speed and load increase. I make use of this peculiarity and to this end I employ an internal combustion engine of the type having a carbureter and connect said outlet to the air inlet of the carbureter. In this manner the suction of the engine causes an amount of air to pass through the motor which varies substantially in accordance with change in speed thereof.

In the accompanying drawing which is illustrative of my invention Figure 1 is a more or less diagrammatic view of a part of a motor car, and Fig. 2 is a view in cross-section of a motor car.

4 indicates the body of a motor car which may be of any suitable construction. 5 indicates a truck of any suitable or ordinary construction having axles 6 upon which are sleeved propelling motors 7. Each of these motors is provided with an inclosed casing 8 having an air inlet 9 for cool air from the atmosphere and an outlet 10 for the air after it has passed through the motor and picked up heat therefrom. 11 indicates a receiver of any suitable construction which is mounted on the car body. In the present illustration it is shown being attached to the under side of the internal combustion engine 12, the latter being supported by feet 13 resting on I beams 14 forming a part of the frame work of the car body. In a construction of this kind the truck 5 has to swivel underneath the car body. On account of this the outlets 10 of the motor casings are connected to the receiver by flexible conduits 15. From the receiver a conduit 16 extends to the carbureter 17. This carbureter may be of any suitable and well-known construction. For example, it may be of the type illustrated in my Patent No. 1,176,627, dated March 21, 1916. 18 indicates the mixing tube of the carbureter from which the mixture is conveyed to the intake manifold 19 by the conduit 20. In this conduit is a throttle valve indicated diagrammatically at 21. This valve is actuated by a hand lever 22.

The engine may be of any suitable construction. As illustrated, it is of the eight-cylinder type and operating with gasolene as a fuel. Suitably supported within the car body and directly connected to the engine is an electric generator 23 that supplies current to the propelling motors 7. Between the generator and the motors is interposed a suitable controller, not illustrated, for controlling the passage of current to the motors and connecting them in series and in parallel, which type of controller is well understood. These details have not been illustrated because they are unnecessary to an understanding of the invention.

Cool air enters the inlet 9 in the motor casing and due to the suction of the engine pistons is caused to pass through the motors and extract heat therefrom, leaving by the outlets 10 and passing through the conduit 15 to the receiver 11. From here the heated air passes through the conduit 16 into the carbureter 17 in which the mixture is formed. The mixture flows through the mixing tube 18 and conduit 20 to the intake manifold subject to the control of the throttle valve 21. As the speed of the engine is varied by the throttle valve the amount of air that passes through the motors is correspondingly increased or decreased. In addition to cooling the motors the arrangement described has the advantage that the heat extracted from the motors assists in vaporizing the fuel. This is particularly desirable where low grade fuels are employed which are not easily vaporized. By reducing the heating effects in the motors, it is possible to use smaller and lighter motors to perform a given amount of work. As an illustration but not a limitation of my invention, I have been able to continuously dissipate an amount of heat equal to 4500 watts in each of the motors as contrasted with about 2500 watts where the motors were not provided with the ventilating system described. From actual practice I have ascertained that the amount of cooling air passing through the motors is substantially proportional to the speed of the engine and to the load thereon.

Although I have shown my invention as arranged to cool only the motors, it is evident that the same system can be extended to the cooling of other electrical apparatus, such, for example, as the generator 23 by employing a conduit such as 16 and inclosing the generator in a casing having an inlet such as 9 and a discharge conduit such as 10.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

In a motor car, the combination of an internal combustion engine having a carbureter, an electric generator direct connected thereto and driven thereby, means for regulating the speed of the engine to meet the varying load conditions, a propelling motor mounted on the car truck and connected to the generator, said motor having an inclosing casing containing an inlet for cool air and an outlet for heated air, and a conduit connecting said outlet with the suction side of said carbureter whereby the amount of air passing through the inclosing casing will vary with changes in speed of the engine.

In witness whereof, I have hereunto set my hand this 29th day of July, 1915.

WILLIAM EVERETT VER PLANCK.

Copies of this patent may be obtained for five cents each, by addressing the "Commissioner of Patents, Washington, D. C."